United States Patent [19]

Pfister-Schneeberger

[11] 3,836,211

[45] Sept. 17, 1974

[54] REVOLVING ROLLER BEARING ARRANGEMENT

[75] Inventor: Ernst Pfister-Schneeberger, Roggwil, Switzerland

[73] Assignee: W. Schneeberger AG, Roggwil, Switzerland

[22] Filed: July 9, 1973

[21] Appl. No.: 377,823

[30] Foreign Application Priority Data

Aug. 28, 1972 Switzerland.................... 12673/72
Feb. 6, 1973 Switzerland...................... 1664/73

[52] U.S. Cl.............................................. 308/6 R
[51] Int. Cl. ........................................ F16c 29/00
[58] Field of Search..................... 308/6; 74/250 R

[56] References Cited
UNITED STATES PATENTS
3,219,398 11/1925 Anderson............................ 308/6 C Primary Examiner—Charles J. Myhre
Assistant Examiner—Frank Susko
Attorney, Agent, or Firm—Werner W. Kleeman

[57] ABSTRACT

A revolving roller bearing or support arrangement, especially for a roller train or conveyor, comprising a support body having an endless guide track between lateral side plates. An endless roller chain with lateral brackets interconnecting each of two respective rollers bears in a spanned condition upon the endless guide track. At least the majority of oppositely situated brackets are fixedly interconnected by a transverse web into pairs of brackets. Each bracket is equipped with two recesses which have their openings angularly directed with respect to one another and each recess engages with a respective roller journal or axle.

10 Claims, 11 Drawing Figures

PATENTED SEP 17 1974 3,836,211

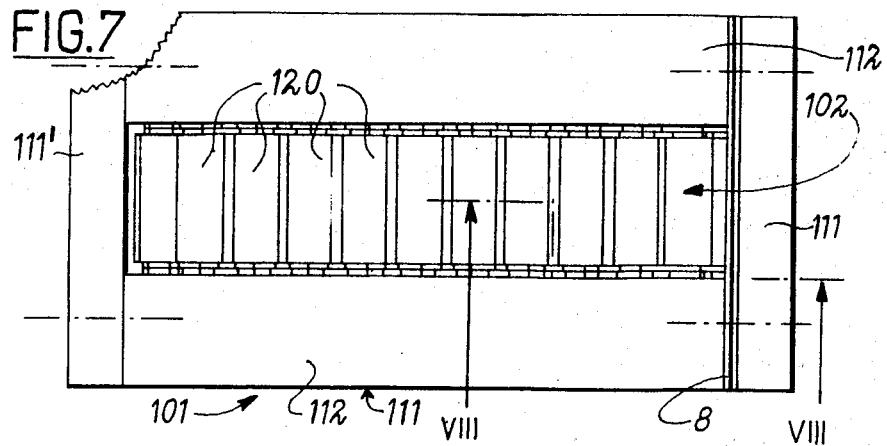
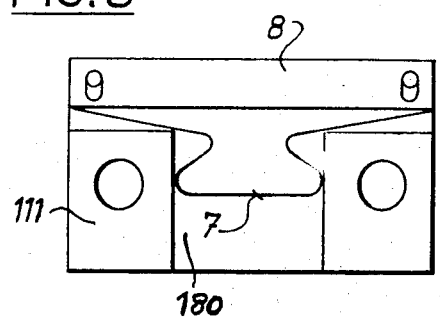
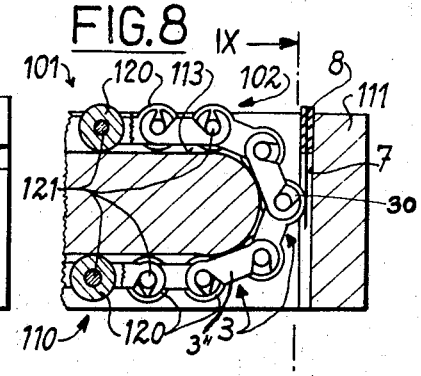
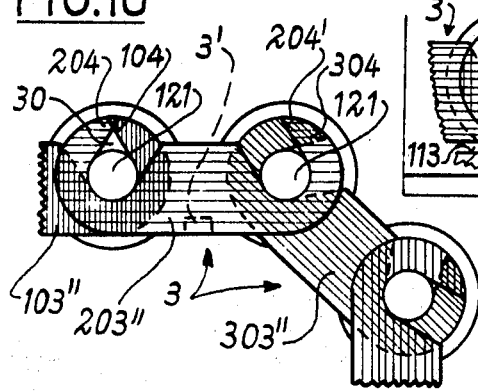
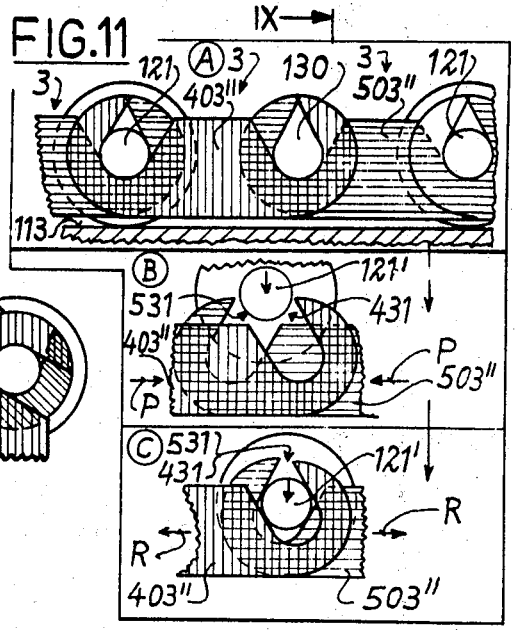

REVOLVING ROLLER BEARING ARRANGEMENT

BACKGROUND OF THE INVENTION

The present invention relates to a new and improved construction of rotary roller bearing or support arrangement, especially for a roller conveyor or roller train, which is of the type comprising a support body having an endless guide track arranged between lateral side plates, and an endless roller chain equipped with lateral brackets or side links operatively interconnecting two respective rollers, the endless roller chain being spanned and supported upon the guide track.

There are already known to the art rotatable or revolving roller bearing arrangements in which the rollers mutually contact one another at their surfaces and are retained either at their centers or ends by guide strips which partially engage therewith or by grooves at the side plates of the support body. These rollers are hindered in their mobility due to frictional contact with one another and by virtue of the possibility of their canting or becoming positioned at an inclination, so that such bearing arrangements possess considerable frictional resistance.

In order to reduce the mutual frictional contact of the rollers and to provide a better guiding against the inclined positioning thereof, there have already been proposed to the art chainlike cages having webs extending parallel to the rollers and engaging between the rollers to prevent the rollers from falling out of the support body. Moreover, cages of the aforementioned type which are flexible and formed of plastic have also heretofore been employed. In any event with this construction the surface of the rollers contact such webs so that there is only obtained a limited improvement as concerns freeing the rollers from the aforementioned frictional contact. Since the rollers must additionally possess a relatively large play in the cage, it has been found that the guiding of the rollers against canting or inclinded positioning is unsatisfactory.

With prior art rotatable roller bearing or support arrangements of the previously mentioned type the surface friction of the rollers at one another and at the brackets is almost completely avoided, but the canted position of the rollers is still present, so that the desired low friction cannot be effectively realized. Furthermore, such rotatable roller bearing arrangements are relatively complicated as concerns their manufacture because each bracket must be individually mounted upon the ends of the rollers which must be maintained at the correct spacing.

SUMMARY OF THE INVENTION

Hence, it is a primary object of the present invention to provide an improved construction of rotatable roller bearing arrangement which is not associated with the aforementioned drawbacks and limitations of the prior art proposals.

Another and more specific object of the present invention relates to a new and improved construction of rotatable roller bearing arrangement enabling the realization of as great as possible freedom in frictional contact and which is nonetheless less complicated to manufacture notwithstanding its extreme precision.

Now in order to implement these and still further objects of the invention, which will become more readily apparent as the description proceeds, the rotatable roller bearing arrangement of this development is manifested by the features that at least the majority of oppositely situated brackets are fixedly connected into bracket pairs by means of transverse webs, and each bracket possesses two recesses which, by means of their openings, are directed at an angle with regard to one another and each such recess engages over a roller axle or journal.

With the heretofore known roller chains which have been constructed in the manner of a bicycle chain it is only possible to realize a relatively good stability against canting of the rollers by providing a very close riveting, because the rectangular construction formed by two rollers and two brackets is not reinforced. Additionally, the riveting operation is disadvantageous and difficult to carry out. With the roller chain of the inventive rotatable roller bearing arrangement there is provided a stabilization of the rectangular arrangement formed by two rollers and a pair of brackets by virtue of the associated transverse web. A canting or inclined positioning of such rectangular construction is almost impossible owing to the side plates of the support body with the usual relatively small amount of play which is present. By virtue of the arrangement of the rollers brought about by the teachings of the invention, wherein in each instance the same roller is part of two such rectangular arrangements, the entire roller chain is extremely stable in lengthwise direction without there existing the necessity of closely, or in fact at all, riveting the ends of the roller axles or journals. Hence, it is possible with the greatest degree of freedom of movement and the smallest friction to avoid the canting of the rollers and therefore to eliminate the second cause of the frictional contact as abovementioned.

Also the assembly of such roller chain is notably simple. The bracket pairs can be easily placed over the adjacently situated rollers such that the roller axles or journals enter into the aforementioned recesses of the brackets. If thereafter the roller chain is closed in endless fashion about and so as to bear upon the guide track, then the roller axles, which are located at the closed recess end of the brackets, can no longer fall out of such recesses, because the lengthwise shortening of the chain necessary for such to happen is prevented due to the bearing contact of the spanned or stretched chain at the guide track of the support body.

As the closure element for the roller chain there can be used, for instance, a simple form of bracket equipped with closed holes which is placed at both sides at the ends of the last roller axles. In order to render this possible one side plate portion should be removable at both sides at an end of the support body. However, there also could be employed a different assembly technique with appropriate construction of the support body, for instance in the case of those having detachable side plates or those wherein the ends of the guide track are constructed as removable bolts. It is then possible to employ all of the brackets in the form of the above-disclosed bracket pairs. In so doing, the entire chain can be brought together into an endless construction and mounted upon the track. It can also however, as will be more fully described hereinafter, be elastically expanded and thus closed.

According to one embodiment of the invention the openings of the recesses of the brackets are directed towards the guide track, the webs advantageously being located at the outside. The open ends of the recesses of the brackets which engage at the same roller axles, where the chain sections bear at the linear sections of the guide track, can be sufficiently closed by parts of the other brackets, in order to prevent the roller axles from falling out of the recesses even with a somewhat loosened (e.g. somewhat elongated) chain. At the convex domed portions of the guide track this is, however, not always positively insured.

According to a further particularly preferred constructional embodiment the rotatable roller bearing or support arrangement is constructed such that openings of the recesses of the brackets are directed away from the guide track, so that even when the roller chain bears upon the guide track no longer in a completely extended or spanned condition, there is insured the positive retention of the rollers at the bearing arrangement.

The advantage of the mutual "closing" of the openings of the brackets which engage at the same roller axles is also here maintained at planar sections of the guide track. In addition there is further present the advantage that with the mutual rocking or pivoting of the brackets at those chain portions which bear at the convex sections of the guide track this "closure" is intensified. Hence, there does not exist the danger that with possible loosening of the chain a roller can fall out of the recesses at the convex sections or portions of the guide track.

Furthermore, what is especially surprising is the fact that in particular with this second arrangement of the bracket pairs there is obtained a considerable simplification in the fabrication of the rotatable roller bearing arrangement. It is specifically possible to mount in a stretched condition at the guide track the not yet endless closed chain which is fabricated by mounting the bracket pairs at adjacently arranged rollers or by inserting the rollers into appropriately arranged rows of bracket pairs, and with appropriate direction of the aforementioned recesses of the brackets. Furthermore, there is realized the result that the not yet occupied recesses of both endwise arranged bracket pair correspond with one another. By simply elongating the chain — within the limits of its appropriately calculated elasticity — the aforementioned free recesses with their openings can be correspondingly aligned. Then it is possible to insert the last roller with its journals or axles in the openings of the recesses and to relax the chain. The roller axles or journals will then automatically move to the closed end of the associated recesses. Such high elongation forces, as would be required for this final mounting with appropriate selection of the materials of the brackets, will not as a general rule arise during use. Moreover, also in this case a certain stretching, as already mentioned, is not as significant. This mounting possibility also possesses the advantage that the support body need not possess any detachable or removable side plate portions. The side plates of the support body thus can be fabricated together with the guide track portion out of one piece and even can extend past the ends of the guide track. This last possibility brings with it a considerable saving during machining of the support body and avoids the pyramid-effect of tolerance errors, which otherwise could arise with separately fabricated side plates. Hence, there can be increased the precision and thus the linear guiding of the rollers.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 7 is a top plan view, similar to the showing of FIG. 1, of a second exemplary embodiment of rotatable roller bearing or support arrangement;

FIG. 8 is a partial sectional view of the arrangement depicted in FIG. 7, taken substantially along the line VIII—VIII thereof;

FIG. 9 is a cross-sectional view of the arrangement of FIG. 8, taken substantially along the line IX—IX thereof;

FIG. 10 is a side view of a part of the roller chain of the roller bearing arrangement of FIGS. 7 and 8 in an enlarged showing; and FIG. 11, encompassing the sub-Figures FIG. 11A, FIG. 11B and FIG. 11C, depict three stages of the endless closing of the roller chain of the rotatable roller bearing arrangement of FIGS. 1 and 2 as viewed from the side and approximately on the same enlarged scale as the showing of FIG. 10.

DETAILED DESCRIPTION OF THE PREFERRED EMBODIMENTS

Figure 1:
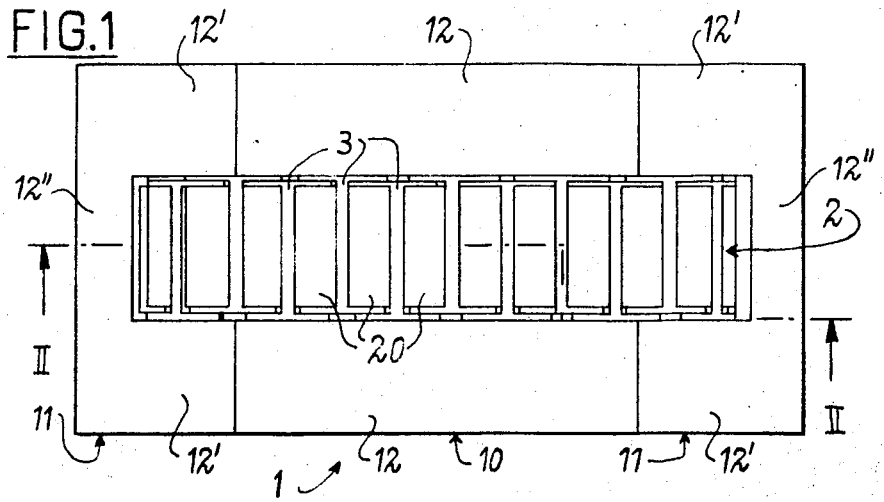
FIG. 1 is a schematic plan view of a first exemplary embodiment of rotatable roller bearing or support arrangement designed according to the teachings of the present invention.
Figure 2:
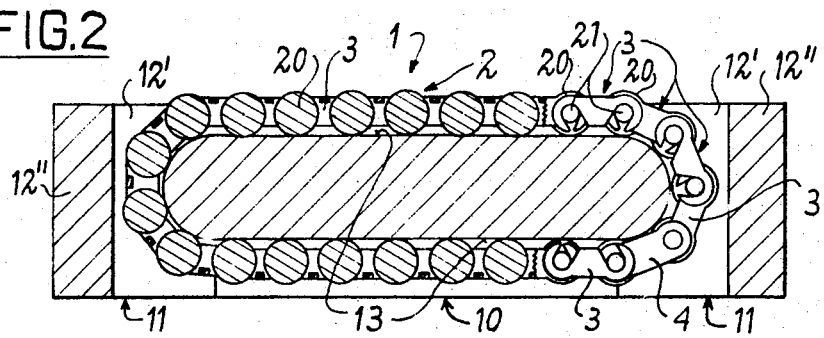
FIG. 2 is a cross-sectional view of the roller bearing arrangement depicted in FIG. 1, taken substantially along the line II—II thereof.
Figure 3:
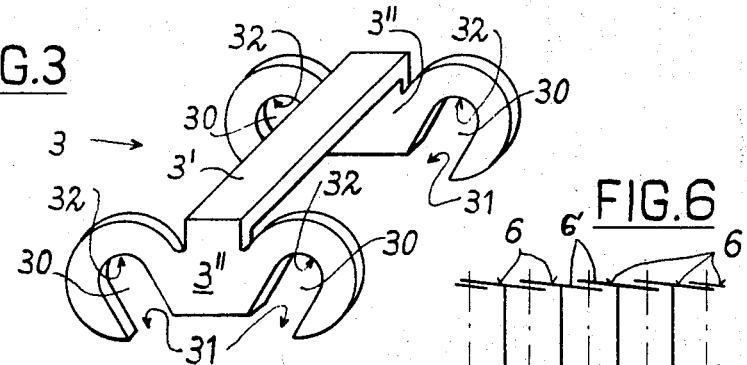
FIG. 3 is an enlarged perspective view of a bracket pair employed in the arrangement of FIGS. 1 and 2.

Describing now the drawings, and considering the exemplary embodiment of rotatable roller bearing or support arrangement as depicted in FIGS. 1 to 3, it will be seen that the support or carrier body 1 of the rotatable roller bearing arrangement depicted in detail in FIGS. 1 and 2 consists of three components or parts, namely a central portion 10 and two end portions 11 threadably connected therewith, the thread connection elements or screws having been conveniently omitted for the sake of clarity in illustration. The central portion 10 includes the side plates 12 and embodies between the central part of the these side plates 12 the endless guide track 13, which has only been illustrated in detail in FIG. 2, whereas the end portions 11 embody the side plate ends 12' and the wall portions 12'' which interconnect the associated side plate ends 12'. The end portions 11 are provided in order that the guide track 13 also can be faultlessly machined at its ends and for the purpose of exposing such guide track ends by eliminating the side plate ends 12' during such time as the roller chain 1 is mounted.

There is also provided a roller chain 2 trained about the guide track 13 and such chain consists of rollers or rolls 20 which possess axles or journals 21 formed of one piece therewith. The recesses 30 of bracket pairs 3, as best seen by referring to FIG. 3, engage with these roller axles or journals 21. It will be seen that each such recess 30 is closed at one end 32 and has an opening 31 at its other end, and that neighboring recesses 30 of each bracket pair 3 are angularly arranged with respect to one another. Each bracket pair 3 consists of the oppositely situated brackets or side straps 3'' which are fixedly interconnected with one another by the associated transversely extending web 3'. The open ends 31 of the recesses 30 are directed towards one another owing to the corresponding inclined arrangement of such recesses 30 and are also directed towards the guide track 13, as best seen by referring to FIG. 2, whereas the roller axles 21, when the roller chain 2 bears in a stretched or spanned condition at the guide track, are located at the closed ends 32 of the recesses 30.

The closure element of the roller chain, as depicted in FIG. 2 is formed by two independent simply apertured or bored brackets or straps 4, only one of which is visible in the showing of FIG. 2, the other being at the opposite non-depicted side of the roller bearing arrangement.

Figure 4:
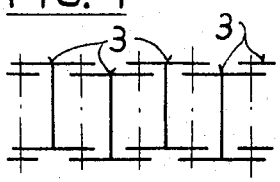
FIG. 4 is a schematic plan view depicting one possible arrangement of the bracket pairs at the rotatable roller bearing arrangement of FIG. 1.

Now according to the schematic showing of FIG. 4, it is possible to arrange in alternate offset relationship the bracket pairs 3 of FIG. 3 at the rotatable roller bearing arrangement of FIGS. 1 and 2 in the manner depicted in such FIG. 4.

Figure 5:
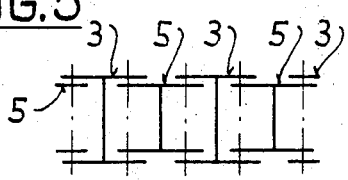
FIG. 5 is a schematic top plan view of a modified arrangement of the bracket pairs.

A different possibility of arranging such bracket pairs has been depicted in FIG. 5, wherein there is shown how, apart from the bracket pairs 3 which are arranged in alignment with one another, there also can be employed narrower bracket pairs 5, likewise arranged in axial spaced alignment.

Figure 6:
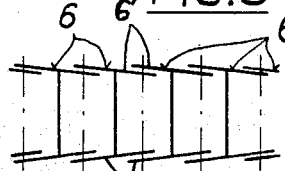
FIG. 6 is a schematic top plan view of still a further modified arrangement of the bracket pairs.

Still a further possibility of arranging the bracket pairs has been shown in FIG. 6, wherein here the bracket pairs 6, the brackets 6' of which are closer together at one end than at the other, are arranged such that they engage with one another in a fish-scale or overlapping formation, as shown. Instead of using such bracket pairs 6 with obliquely or angularly arranged brackets 6' it would be possible to use appropriately offset brackets to realize the same effect.

Instead of the individual brackets or links 4 it is also possible to use a bracket pair 3 if one of the associated rollers is throughbored and provided with a bolt constructed as a plug axle. In such modified construction all of the bracket pairs would be of the same design.

Considering now the modified construction of rotatable roller bearing arrangement as depicted in FIGS. 7 to 11, it will be recognized that the support or carrier body 101 of the roller bearing arrangement of such embodiment consists of a central portion or part 110 and both of the end plates or portions 111 and 111' which are threadably connected therewith in any suitable fashion. In contrast to the arrangement of FIG. 1, here the central portion 110 of the support body 101 is fabricated from one-piece or integrally with the entire side plates 112, so that the side plate ends extend past the ends of the guide track 113 located between such side plates. At the ends of the side plates 112 there are threadably connected the end plates 111 and 111'.

The endless closed roller chain 102 bears in a stretched or spanned state upon the guide track 113. This roller chain 102 consists of the throughbored rollers 120 with their inserted shafts or axles 121 and the bracket pairs 3, similar to the bracket pair 3 discussed above in conjunction with FIG. 3. Hence, it is to be understood that here there are provided the same components, i.e., it is possible to dispense with the use of specially constructed closure links or elements. Instead of the hollow rollers 120 with the insertable axles or journals 121 it would, of course, be possible to employ in the same manner (without any special closure elements) also solid body rollers with axles or journals provided integrally thereat.

By referring to FIG. 8 there is revealed the direction of the recesses 30 of the brackets 3'' of each bracket pair 3. Furthermore, from FIGS. 8 and 9 there will be recognized the stripper 8 with its spring 7 which is accommodated in a T-shaped recess 180 of the end plate 111. Owing to the fact that at the end plate 111 there are not required any or only very small side plate portions this mounting possibility of the stripper is facilitated. Such constitutes an advantage of this embodiment of the invention. The stripper can be readily exchanged.

In FIG. 10 it will be seen that brackets 103'' and 203'' are arranged neighboring and aligned with one another, wherein by means of the depicted shading there will be readily recognized that the axles or journals 121 seated in the overlapping recesses 30, by virtue of the slightly overlapping tips 204 and 104 of the brackets 103'' and 203'' respectively, cannot drop out. The axle 121 seated at the brackets 203'' and 303'' is even better secured because owing to the rocked position of such brackets their tips 204' and 304 even further overlap with one another, as was explained previously for the tips 104 and 204. With the embodiment of FIG. 2 there occurs at the location of this intensification of the tip overlapping a gradual alignment or unidirectional orientation of the recesses, which then could bring about the dropping out of the axles if unfavorable factors tend to add to one another.

In FIG. 11 there is shown in sub-FIG. 11A a linear row of bracket pairs 3 which embody both of the brackets 403'' and 503'' which engage about the not yet endless closed chain end, and which form the openings 130 at their still free recesses when the roller chain is spanned about and bears upon the guide track 113.

According to the showing of FIG. 11B by tightening the chain in the direction of the arrow P the end recesses of the brackets 403'' and 503'' are displaced over one another to such an extent that the mouths 431 and 531 coincide in width to the diameter of the axle 121 of a roller. The roller axle or journal 121 can be introduced in the direction of the depicted arrow. Now the chain is permitted to relax, whereby the brackets 403'' and 503'' gradually move in the direction of the arrow R back into the position depicted in FIG. 11A. Finally, FIG. 11C illustrates how the roller axle or journal 121 is automatically displaced towards the closed end of the recesses of the brackets 403'' and 503''. As a result the mouths 431 and 531 are closed.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A rotatable roller bearing arrangement, especially for roller conveyors or the like, comprising a support body and lateral side plate means, an endless guide track disposed between said lateral side plate means, an endless closed roller chain bearing in spanned state upon said endless guide track, said endless roller chain having rollers and brackets laterally arranged to each side of said rollers, each bracket interconnecting each two respective neighboring rollers, the majority of oppositely situated brackets being fixedly interconnected into respective bracket pairs by a respective transversely extending web, each bracket having two recesses open at one end and angularly directed towards one another by means of their openings, said rollers having axles, and a respective recess of each bracket engaging with the roller axle of the associated roller.

2. The roller bearing arrangement as defined in claim 1, wherein said recesses are directed with their opening towards the guide track.

3. The roller bearing arrangement as defined in claim 1, wherein said recesses are directed with openings away from the guide track.

4. The roller bearing arrangement as defined in claim 1, wherein the bracket pairs are identical to one another and arranged in alternate offset relationship.

5. The roller bearing arrangement as defined in claim 1, wherein the bracket pairs comprise two types of bracket pairs having two different spacings of the respective brackets from one another and alternately arranged with regard to one another.

6. The roller bearing arrangement as defined in claim 1, wherein opposed confronting ends at one end of the same bracket pair are spaced a different distance from one another than opposed confronting ends at the opposite end of the same bracket pair, and wherein the smaller spaced ends of a bracket pair engage in the larger spaced ends of the next adjacent bracket pair.

7. The roller bearing arrangement as defined in claim 1, wherein two oppositely situated brackets are devoid of any transversly extending web and serve as closure element means for the roller chain.

8. The roller bearing arrangement as defined in claim 7, wherein said two oppositely situated brackets devoid of the transversely extending web are provided with closed holes for receiving the roller axles.

9. The roller bearing arrangement as defined in claim 1, wherein all of the oppositely situated brackets are interconnected with one another by a respective transversely extending web into respective bracket pairs.

10. The roller bearing arrangement as defined in claim 9, wherein the side plate means of the support body are integrally formed with the guide track and extend at all sides past the guide track.

* * * * *